United States Patent
Mandiganal et al.

(10) Patent No.: US 11,032,874 B2
(45) Date of Patent: *Jun. 8, 2021

(54) SHADOW ACCESS POINT FOR HIERARCHICAL TREE NETWORK USING 802.11 INFRASTRUCTURE NODES IN FIRE DETECTION SYSTEMS AND OTHER SYSTEMS

(71) Applicant: Honeywell International Inc., Morris Plains, NJ (US)

(72) Inventors: Santosh M. Mandiganal, Hubli (IN); Patrick S. Gonia, Maplewood, MN (US); Steve D. Huseth, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,908

(22) Filed: Sep. 9, 2019

(65) Prior Publication Data

US 2019/0394835 A1  Dec. 26, 2019

Related U.S. Application Data

(63) Continuation of application No. 13/826,342, filed on Mar. 14, 2013, now Pat. No. 10,412,783.

(51) Int. Cl.
*H04W 88/08* (2009.01)
*H04W 84/12* (2009.01)
(Continued)

(52) U.S. Cl.
CPC ............ *H04W 88/08* (2013.01); *G08B 25/10* (2013.01); *G08B 29/16* (2013.01);
(Continued)

(58) Field of Classification Search
CPC ..... G08B 25/10; G08B 29/16; H04L 41/0654; H04W 12/04; H04W 12/00403; H04W 84/12; H04W 84/18; H04W 88/08
See application file for complete search history.

(56) References Cited

U.S. PATENT DOCUMENTS

| | | |
|---|---|---|
| 4,679,189 A | 7/1987 | Olson et al. |
| 5,898,826 A | 4/1999 | Pierce et al. |

(Continued)

FOREIGN PATENT DOCUMENTS

| | | |
|---|---|---|
| EP | 1789936 | 12/2009 |
| EP | 2331886 | 6/2011 |
| WO | 2012168262 A1 | 12/2012 |

OTHER PUBLICATIONS

European Search Report dated Jun. 24, 2014 in connection with European Patent Application No. 14158218.9, 3 pages.

(Continued)

*Primary Examiner* — Kashif Siddiqui
(74) *Attorney, Agent, or Firm* — Brooks, Cameron & Huebsch, PLLC

(57) ABSTRACT

A system includes first and second access points. Each access point includes one or more 802.11 wireless radios configured to communicate with a wireless node. The first and second access points are both configured to wirelessly receive first data from the wireless node at substantially a same time and forward the first data. The first and second access points are also both configured to receive second data for the wireless node. The first access point is configured to wirelessly transmit the second data to the wireless node, and the second access point is configured to refrain from transmitting the second data to the wireless node while the first access point is operating properly.

20 Claims, 4 Drawing Sheets

(51) Int. Cl.
  *G08B 25/10*  (2006.01)
  *G08B 29/16*  (2006.01)
  *H04L 12/24*  (2006.01)
  *H04W 12/04*  (2021.01)
  *H04W 84/18*  (2009.01)
  *H04W 12/43*  (2021.01)

(52) U.S. Cl.
  CPC ......... *H04L 41/0654* (2013.01); *H04W 84/12* (2013.01); *H04W 12/04* (2013.01); *H04W 12/43* (2021.01); *H04W 84/18* (2013.01)

(56) References Cited

U.S. PATENT DOCUMENTS

| | | | |
|---|---|---|---|
| 7,031,308 | B2 | 4/2006 | Garcia-Luna-Aceves et al. |
| 7,035,240 | B1 | 4/2006 | Buddhikot et al. |
| 7,035,937 | B2 | 4/2006 | Haas et al. |
| 7,203,743 | B2 | 4/2007 | Shah-Heydari |
| 7,620,409 | B2 | 11/2009 | Budampati et al. |
| 7,688,802 | B2 | 3/2010 | Gonia et al. |
| 7,742,394 | B2 | 6/2010 | Budampati et al. |
| 7,881,253 | B2 | 2/2011 | Budampati et al. |
| 7,933,240 | B2 | 4/2011 | Budampati et al. |
| 8,189,494 | B2 | 5/2012 | Budampati et al. |
| 8,264,956 | B2 | 9/2012 | Ramankutty et al. |
| 9,036,489 | B2 | 5/2015 | Huseth et al. |
| 9,894,580 | B1* | 2/2018 | Chen ................... H04W 36/08 |
| 10,412,783 | B2* | 9/2019 | Mandiganal ........ H04L 41/0654 |
| 2002/0072329 | A1 | 6/2002 | Bandeira et al. |
| 2002/0176396 | A1 | 11/2002 | Hammel et al. |
| 2004/0136318 | A1* | 7/2004 | Bentley ................ H04W 24/04 |
| | | | 370/221 |
| 2004/0174829 | A1 | 9/2004 | Ayyagari |
| 2004/0259533 | A1 | 12/2004 | Nixon et al. |
| 2005/0281215 | A1 | 12/2005 | Budampati et al. |
| 2006/0039347 | A1 | 2/2006 | Nakamura et al. |
| 2006/0128349 | A1 | 5/2006 | Beyer et al. |
| 2006/0274644 | A1 | 12/2006 | Budampati et al. |
| 2006/0274671 | A1 | 12/2006 | Budampati et al. |
| 2007/0110018 | A1 | 5/2007 | Delaney et al. |
| 2008/0010304 | A1 | 1/2008 | Vempala et al. |
| 2008/0043637 | A1* | 2/2008 | Rahman .................. H04L 45/48 |
| | | | 370/254 |
| 2008/0151801 | A1 | 6/2008 | Mizuta |
| 2008/0267259 | A1 | 10/2008 | Budampati et al. |
| 2008/0273547 | A1 | 11/2008 | Phinney |
| 2008/0291881 | A1 | 11/2008 | Vranken et al. |
| 2009/0022121 | A1 | 1/2009 | Budampati et al. |
| 2009/0034441 | A1 | 2/2009 | Budampati et al. |
| 2009/0109889 | A1 | 4/2009 | Budampati et al. |
| 2009/0147702 | A1 | 6/2009 | Buddhikot et al. |
| 2009/0181623 | A1 | 7/2009 | Twitchell, Jr. |
| 2009/0274060 | A1 | 11/2009 | Taylor |
| 2010/0177684 | A1 | 7/2010 | Kore et al. |
| 2010/0220600 | A1 | 9/2010 | Mirza |
| 2010/0250015 | A1 | 9/2010 | Flikkema |
| 2011/0299421 | A1 | 12/2011 | Werb et al. |
| 2013/0156016 | A1 | 6/2013 | Debnath et al. |
| 2013/0342347 | A1 | 12/2013 | Huseth et al. |

OTHER PUBLICATIONS

European Office Action dated Aug. 11, 2014 in connection with European Patent Application No. 14158218.9, 7 pages.
Cisco Systems et al.; "Cisco IOS Software Configuration Guide for Cisco Aironet Access Points"; XP002424858; Chapter 19; Internet Citation; Apr. 2004; 12 pages.
European Application Serial No. 14158218.9, Response filed Aug. 7, 2017 to Office Action dated Apr. 4, 2007, 12 pgs.
European Application Serial No. [Pending], Examination Notification Art. 94(3) dated Aug. 11, 2014.
European Application Serial No. 14158218.9, Response filed Feb. 23, 2015 to Office Action dated Aug. 11, 2014, 21 pqs.
European Application Serial No. 14158218.9, Office Action dated Aug. 11, 2014, 7 pgs.
Dr. Soumitri Kolavennu, Presentation, "WNSIA MAC Layer", ISA SP100 meeting, Feb. 14, 2007, 24 pages.
Ying Zhang et al., "A Learning-based Adaptive Routing Tree for Wireless Sensor Networks", Journal of Communications, vol. 1, No. 2, May 2006, 10 pages.
Yau-Ming Sun, et al., "An Efficient Deadlock-Free Tree-Based Routing Algorithm for Irregular Wormhole-Routed Networks Based on the Turn Model", Proceedings of the 2004 International Conference on Parallel Processing (ICPP'04), 10 pages.
Sejun Song, "Fault Recovery Port-based Fast Spanning Tree Algorithm (FRP-FAST) for the Fault Tolerant Ethernet on the Arbitrary Switched Network Topology", 2001 IEEE, p. 325-332.
Manmath Narayan Sahoo, et al., "A Redundant Neighborhood Approach to Tolerate Access Point Failure in IEEE 802.11 WLAN", Fourth International Conference on Industrial & Information Systems, Dec. 28-31, 2009, Faculty of Engineering University of Peradeniya, Sri Lanka, 6 pages.

* cited by examiner

SHADOW ACCESS POINT FOR HIERARCHICAL TREE NETWORK USING 802.11 INFRASTRUCTURE NODES IN FIRE DETECTION SYSTEMS AND OTHER SYSTEMS

PRIORITY INFORMATION

This application is a Continuation of U.S. application Ser. No. 13/826,342, filed Mar. 14, 2013, the contents of which are incorporated herein by reference.

TECHNICAL FIELD

This disclosure relates generally to monitoring and alarm systems. More specifically, this disclosure relates to a shadow access point for a hierarchical tree network using IEEE 802.11 infrastructure nodes in fire detection systems and other systems.

BACKGROUND

Fire detection systems and other monitoring and alarm systems routinely include a large number of monitoring nodes distributed in a building or other space. The monitoring nodes monitor their surrounding environment and trigger an alarm when a specified condition is detected.

In some systems, monitoring nodes communicate wirelessly with each other and with a centralized monitoring and alarm station. Conventional monitoring and alarm systems that support wireless communications often use battery-operated monitoring nodes with narrowband radios. These monitoring nodes can form a wireless mesh network, which allows the monitoring nodes to monitor a large area. However, in wireless monitoring and alarm systems, redundant communication links are often necessary or desired for providing reliable communications. Providing redundant communication links in a wireless mesh network is typically very easy. In wireless networks supporting other protocols, however, it can be much more difficult to provide redundant wireless communication links.

SUMMARY

This disclosure provides a shadow access point for a hierarchical tree network using IEEE 802.11 infrastructure nodes in fire detection systems and other systems.

In a first embodiment, a system includes first and second access points. Each access point includes one or more 802.11 wireless radios configured to communicate with a wireless node. The first and second access points are both configured to wirelessly receive first data from the wireless node at substantially a same time and forward the first data. The first and second access points are also both configured to receive second data for the wireless node. The first access point is configured to wirelessly is transmit the second data to the wireless node, and the second access point is configured to refrain from transmitting the second data to the wireless node while the first access point is operating properly.

In a second embodiment, an apparatus includes one or more 802.11 wireless radios configured to communicate with a wireless node and a controller configured to cause the apparatus to operate as one of: a primary access point and a shadow access point. As the primary access point and as the shadow access point, the apparatus is configured to wirelessly receive first data from the wireless node and forward the first data. As the primary access point, the apparatus is configured to receive second data for the wireless node and wirelessly transmit the second data to the wireless node. As the shadow access point, the apparatus is configured to receive the second data for the wireless node and refrain from transmitting the second data to the wireless node while another access point is operating properly to send the second data to the wireless node.

In a third embodiment, a method includes communicating at a first access point with a wireless node, where the first access point includes one or more 802.11 wireless radios. The method also includes selectively operating the first access point as one of: a primary access point and a shadow access point. As the primary access point and as the shadow access point, the first access point wirelessly receives first data from the wireless node and forwards the first data. As the primary access point, the first access point receives second data for the wireless node and wirelessly transmits the second data to the wireless node. As the shadow access point, the first access point receives the second data for the wireless node and refrains from transmitting the second data to the wireless node while a second access point is operating properly and transmits the second data to the wireless node.

Other technical features may be readily apparent to one skilled in the art from the following figures, descriptions, and claims.

BRIEF DESCRIPTION OF THE DRAWINGS

For a more disclosure, reference complete understanding is now made to the of this following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
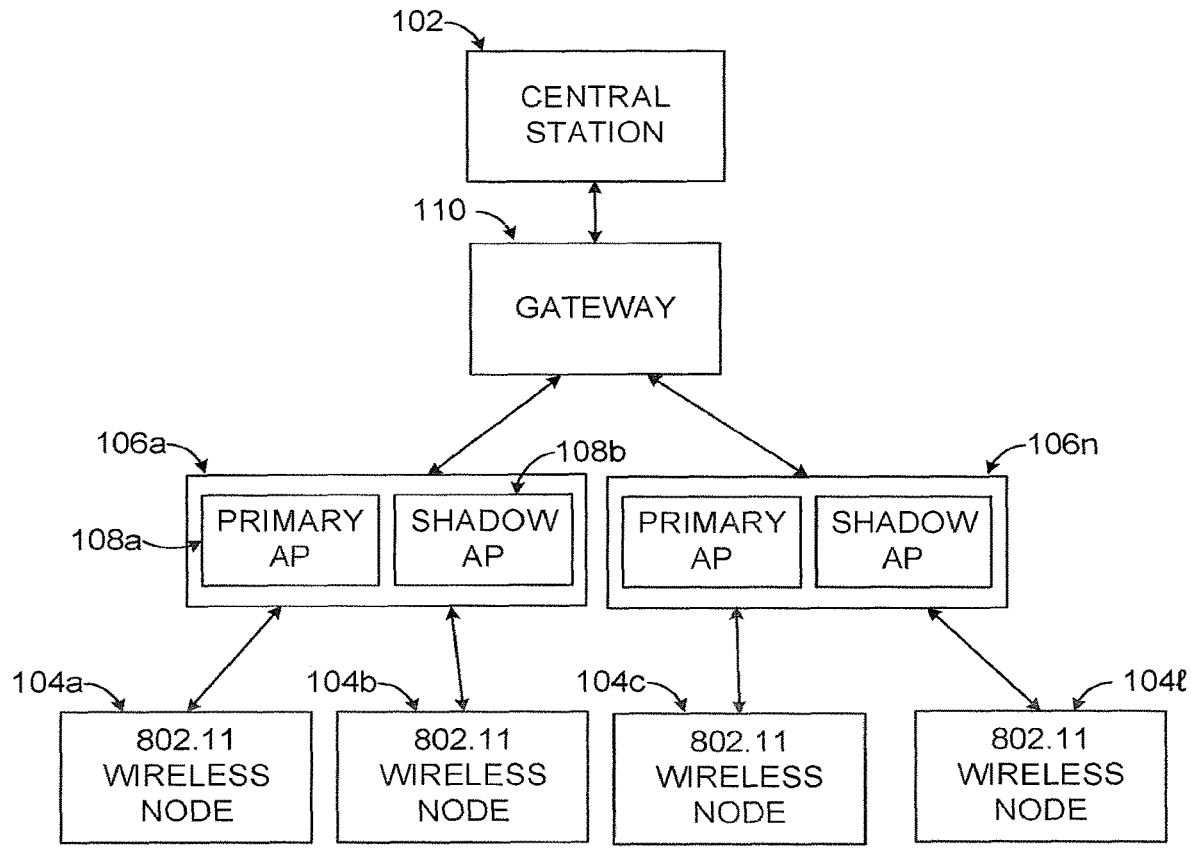
FIG. 1 illustrates an example monitoring and alarm system in accordance with this disclosure.

FIG. 1 illustrates an example monitoring and alarm system 100 in accordance with this disclosure. As shown in FIG. 1, the system 100 includes a central station 102 and multiple IEEE 802.11 wireless nodes 104a-104l. The central station 102 supports centralized monitoring of a given area or areas based on data from the wireless nodes 104a-104l. The central station 102 also generates or presents alarms to notify personnel of one or more conditions detected by the wireless nodes 104a-104l. The central station 102 includes any suitable structure supporting monitoring or alarming operations. For example, the central station 102 could include one or more displays for presenting information to one or more users, such as information identifying data from the wireless nodes 104a-104l and any detected conditions or alarms.

Each wireless node 104a-104l represents a monitoring node having detection or monitoring components allowing the node to monitor its surrounding environment and detect one or more specified conditions. The specified conditions could include the presence of smoke, heat, fire, carbon monoxide, movement, or intruders. The wireless nodes 104a-104l are also capable of transmitting and receiving wireless signals using wireless radios that support one or more IEEE 802.11 protocols. Each wireless node 104a-104l could further support additional functions depending on the implementation. Each wireless node 104a-104l, includes any suitable structure for detecting one or more conditions. Each wireless node 104a-104l also includes one or more IEEE 802.11 wireless radios. The wireless nodes 104a-104l, could represent devices powered internally by local power supplies (such as batteries, solar cells, or fuel cells) or line-powered devices.

In this example, communications between the central station 102 and the wireless nodes 104a-104l occur through various 802.11 access point groups 106a-106n. Each access point group 106a-106n includes multiple 802.11 access points 108a-108b. The access points 108a-108b are capable of transmitting wireless signals to and receiving wireless signals from the wireless nodes 104a-104l. The access points 108a-108b are also capable of communicating with the central station 102 through wired or wireless backhaul links. Each access point 108a-108b includes any suitable structure facilitating communication between multiple monitoring nodes and a backhaul link, such as one or more IEEE 802.11 wireless radios.

An optional gateway 110 could be used in the system 100 to support the exchange of data between the central station 102 and the access point groups 106a-106n. For example, if the access point groups 106a-106n communicate over wireless backhaul links, the gateway 110 could communicate with the access point groups 106a-106n over the wireless backhaul links. The gateway 110 could also be coupled to the central station 102 using a wired connection. Here, the gateway 110 could convert wireless-formatted data from the access point groups 106a-106n into wired-formatted data for the central station 102 (or vice versa). The gateway 110 could also support the exchange of data between access point groups 106a-106n. The gateway 110 includes any suitable structure facilitating communication between different components using different protocols. Note, however, that the use of the gateway 110 is optional. For instance, the central station 102 could communicate directly with the access point groups 106a-106n over wired or wireless backhaul links.

In this example, various network devices (components 104a-104l, 108a-108b, 110) use IEEE 802.11 wireless radios in infrastructure mode, and these components are arranged in a hierarchical tree configuration. That is, each wireless component in the system 100 (except the top node) communicates with a parent node, and each wireless component in the system 100 can communicate with one or more child nodes. The head of the tree is typically the central station 102 or the gateway 106. The number of network devices in each level of the tree and the number of levels in the tree can vary depending on the particular implementation.

In general, IEEE 802.11 protocols allow wireless radios to operate in the infrastructure mode, where each wireless radio can function as one of an access point or a station (or possibly both at the same time). An access point in the IEEE 802.11 protocols generally represents a device that receives and routes data from one or more stations. A station in the IEEE 802.11 protocols generally represents a device that communicates with other devices via an access point.

Unfortunately, the IEEE 802.11 protocols only allow a station to associate with a single access point when operating in 802.11 infrastructure mode. While redundant communication paths can easily exist in wireless mesh networks, this feature of the IEEE 802.11 protocols typically forces a monitoring device with an IEEE 802.11 radio to have a single communication link for wireless communication with a single access point. This makes the overall network much less reliable. This can be problematic in a number of ways. For instance, in a fire detection or security system, the failure of a single access point could prevent multiple monitoring nodes from triggering fire or intrusion alarms.

In accordance with this disclosure, the access point groups 106a-106n provide redundant wireless communication paths even in 802.11-based systems operating in infrastructure mode. Each access point group 106a-106n includes a primary access point 108a and a shadow access point 108b. The primary and shadow access points 108a-108b in each group 106a-106n can be co-located, meaning they are placed physically near one another. All access points in the system 100 can share the same 802.11 service set identifier (SSID), or multiple subnetworks could use different SSIDs with different access points.

During normal operation, the primary and shadow access points 108a-108b in a group 106a-106n share the same network parameters, authentication credentials, network credentials, and other information. This information could be shared in any suitable manner, such as via the central station 102 or gateway 110. The primary access point 108a in the group 106a-106n transmits data to those wireless nodes 104a-104l e operating as child nodes to the primary access point 108a, while the shadow access points 108b in the group 106a-106n operates in listening mode. Effectively, the shadow access point 108b behaves as a "sniffer" and remains ready to assume operation as a primary access point if problems develop with the associated primary access point 108a. An access point's transition from shadow mode to primary mode could occur in response to any suitable criteria, such as an indication from the central station 102.

As an example of network operations, the primary access point 108a in each group 106a-106n can be responsible for transmitting beacon signals to the wireless nodes 104a-104l that are associated with that access point 108a. The shadow access point 108b in that group 106a-106n could listen for the beacon signals to help verify that the primary access point 108a is operating properly. If a primary access point 108a fails, its shadow access point 108b could immediately begin transmitting the beacon signals using the same network information, such as the same basic service set (BSS) identifier (BSSID). From the perspective of the wireless nodes served by the failed access point 108a, no change in network operation may be noticed since a single access point is still transmitting beacons using the same BSSID. In the IEEE 802.11 protocols, a BSS represents a single access point and all stations communicating with that access point. In FIG. 1, however, since only the primary access point 108a in a group transmits data to wireless nodes while the shadow access point 108b in the group listens, both access points 108a-108b can share the same BSSID.

As another example of network operations, when a wireless node 104a-104l transmits data to its primary access point 108a, the shadow access point 108b (operating in listening mode) can receive the same data. As a result, both the primary and shadow access points 108a-108b can forward the data to the central station 102, and the central station 102 may support the ability to recognize and discard duplicate data messages. Alternatively, one or both access points 108a-108b could be used to identify and handle duplicate messages, or a component inserted between the access points 108a-108b and the central station 102 (such as the gateway 110) could identify and handle duplicate messages. From the perspective of the wireless node 104a-104l, again no modification of the IEEE 802.11 protocol is necessary since the wireless node appears to transmit data to a single access point.

Similarly, for outgoing data sent to a wireless node 104a-104l, the primary access point 108a serving that wireless node can transmit wireless messages to the wireless node. The shadow access point 108b can receive the same data to be transmitted to the wireless node, but the shadow access point 108b refrains from transmitting that data as long as the primary access point 108a is operating properly. Once again, from the perspective of the wireless node, no modification of the IEEE 802.11 protocol is necessary since the wireless node receives data from a single access point.

In some embodiments, the central station 102 can configure and reconfigure various components in the system 100, such as during installation or at other times. For instance, the central station 102 could change the network parameters of the system during operation as needed. The central station 102 can also be responsible for detecting faulty access points and reconfiguring the operational mode (primary versus shadow) for the access points 108a-108b in each group. For example, primary and shadow access points 108a-108b could transmit "heartbeat" signals indicating their health to the central station 102. The heartbeat signals help to maintain the health of the system, and non-receipt of a heartbeat signal (such as for a specified duration) can be used to identify non-functional access points for repair or replacement. The heartbeat signals could be sent at any suitable interval, such as one heartbeat signal per Target Beacon Transmission Time (TBTT) interval, although other intervals (like more than one heartbeat signal per TBTT) can be used. Also, different access points 108a-108b in a group could transmit heartbeat signals at the same interval or at different intervals.

In the event of a malfunction of a primary access point 108a, the central station 102 can stop receiving that access point's heartbeat signals. In response, the central station 102 causes the associated shadow access point 108b to switch modes and operate in the primary access point mode, and the old primary access point 108a can be marked for repair or replacement. In the event of a malfunction of a shadow access point 108b, the central station 102 can stop receiving that access point's heartbeat signals. The system can continue to function as usual (since the primary access point 108a can still communicate with wireless nodes), and the shadow access point 108b can be marked for repair or replacement.

In this way, each shadow access point 108b supports a communication path that is redundant to the communication path supported by its primary access point 108a. Moreover, this is done in a manner that is generally invisible to the wireless nodes 104a-104l communicating with those access points 108a-108b. As a result, compliance with IEEE 802.11 protocols is maintained, allowing standard 802.11 wireless radios to be used.

The use of standard IEEE 802.11 wireless radios in various components of FIG. 1 can provide several advantages. For example, IEEE 802.11 radios are typically less expensive than custom mesh network radios, and IEEE 802.11 radios can offer higher data rates and larger bandwidths. This allows the system 100 to support the creation of a wireless network with larger network capacities, which can support additional services like voice and video transport. Also, IEEE 802.11 radios are becoming more and more power efficient, reducing power consumption and prolonging the operational life of any internal power supplies in network components (assuming the network components are not line-powered). In addition, IEEE 802.11 radios support the creation of secured wireless networks based on standard IEEE 802.11 security protocols, support better interference handling, and increase the ease of implementing and maintaining network-level time synchronization. The overall result allows the system 100 to create a larger-capacity and longer-range wireless network using standard IEEE 802.11-based devices.

In some embodiments, access points and wireless nodes communicate using a time division multiple access (TDMA) protocol. For example, a TDMA protocol could divide time into multiple time slots, and communications between an access point and a wireless node occur during the time slot assigned to that wireless node. Also, in some embodiments, a wireless node can periodically wake up and wirelessly transmit data (such as sensed information) to its access point(s) 108a-108b. The transmit address in a data message can be the BSSID of its access point(s) 108a-108b, and the message may be received by both the primary and shadow access points 108a-108b. A wireless node may also wake up periodically to receive beacons or other signals from its primary access point 108a. The allocation of time slots for wireless transmissions can be done in any suitable manner, such as one-time during network setup and possibly changed later to accommodate new nodes or changing network conditions.

Each access point 108a-108b can be aware of the number of wireless nodes associated with it, and non-receipt of data from a wireless node for a considerable duration (such as a configurable time) can be flagged by the access point to the central station 102 as a possible failure of the wireless node. Wireless nodes can also transmit other information, such as the states of their internal power supplies, to the access points for delivery to the central station 102. Access points can similarly transmit their health information, as well as information about the wireless network (such as RSSI or interference measurements) to the central station 102. Such information and statistics can be collected at the central station 102 to support maintenance tasks.

In some embodiments, the wireless nodes 104a-104l may be authenticated with their respective access points (such as their primary access points 108a) during network installation, node installation, or other time(s). Authentication could occur using a pre-shared key the first time, and the security credentials can be changed later. Authentication can help to restrict a rogue node from injecting faults into the network. Authentication information received or used by the primary access point 108a for communication with a wireless node could be shared with the corresponding shadow access point 108b, such as over their backhaul links.

The use of shadow access points could be beneficial in any suitable monitoring or alarming system. Example systems include fire detection systems, gas sensor systems, and public announcement systems. Any other suitable system could incorporate this functionality.

Although FIG. 1 illustrates one example of a monitoring and alarm system 100, various changes may be made to FIG.

1. For example, the system 100 could include any number of central stations, access point groups, and gateways, and various components (such as the gateway) could be omitted. The system 100 could also include any number of wireless monitoring nodes arranged in any suitable number of hierarchical levels in a tree. Further, the monitoring functionality of a wireless node 104a-104t could be incorporated into an access point 108a-108b, and/or the routing functionality of an access point 108a-108b could be incorporated into a wireless node 104a-104l. As a result, the use of a shadow access point 108b for a primary access point 108a could be incorporated into multiple levels of the hierarchy, including in the nodes 104a-104l. Moreover, each access point group 106a-106n could include more than two access points, thereby providing more than two communication paths. In addition, note that not every access point in the system 100 needs a backup shadow access point. The use of shadow access points could be limited, for instance, to those primary access points transporting more important or critical data.

Figure 2:
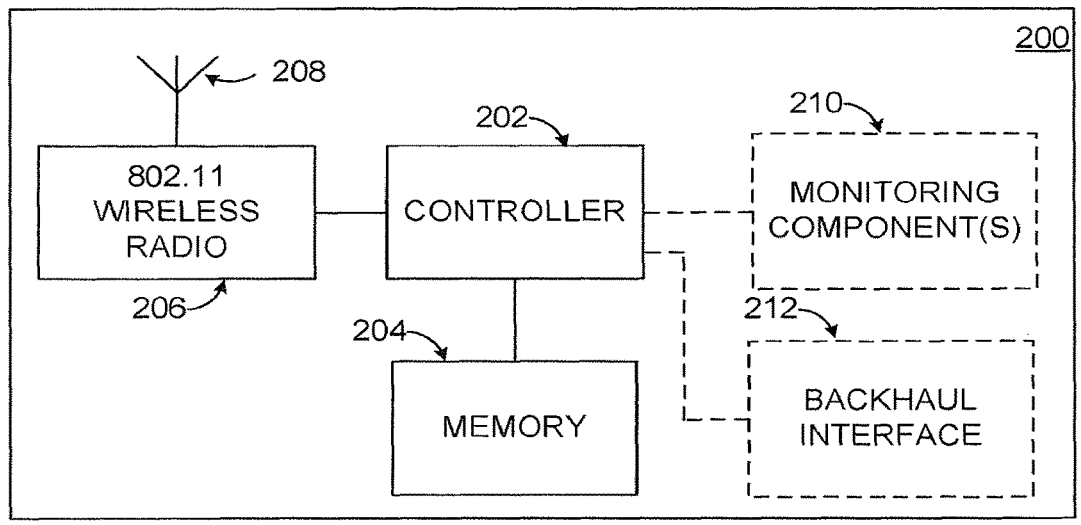
FIG. 2 illustrates an example wireless node in a monitoring and alarm system in accordance with this disclosure.

FIG. 2 illustrates an example wireless node 200 in a monitoring and alarm system in accordance with this disclosure. The wireless node 200 here could represent any of the wireless nodes 104a-104l or access points 108a-108b in the system 100 of FIG. 1. The wireless node 200 could also represent the gateway 110 or part of the central station 102 in FIG. 1.

As shown in FIG. 2, the node 200 includes a controller 202, which controls the overall operation of the node 200. For example, the controller 202 may obtain or generate data to be transmitted, such as data based on one or more sensed environmental conditions. The controller 202 could also generate heartbeat signals or other signals used to indicate proper operation of the wireless node 200. The controller 202 could further receive data transmitted wirelessly. In addition, the controller 202 in an access point 108a-108b could control whether the access point operates as a primary or shadow access point. The controller 202 includes any suitable structure for controlling operation of a wireless node. As particular examples, the controller 202 could represent at least one microprocessor, microcontroller, field programmable gate array, application specific integrated circuit, or other processing or control device A memory 204 is coupled to the controller 202. The memory 204 stores data used, collected, or generated by the node 200. For example, the memory 204 could store information received at or to be transmitted from the 15 wireless node 200. The information to be transmitted could originate at the wireless node 200 or be received from another device for relay towards an intended destination. The memory 204 includes any suitable volatile and/or non-volatile storage and retrieval device(s).

The node 200 also includes at least one IEEE 802.11 wireless radio 206 and at least one antenna 208. The wireless radio(s) 206 and antenna(s) 208 can be used to communicate wirelessly with other devices, such as the central station 102, wireless nodes 104a-104l, access points 108a-108b, or gateway 110. Each wireless radio 206 includes any suitable structure for communicating using at least one IEEE 802.11 protocol. Each antenna 208 includes any suitable structure for transmitting and receiving wireless signals.

If the node 200 represents a monitoring device, the node 200 could also include one or more monitoring components 210. The monitoring components 210 allow the node 200 to sense one or more environmental conditions around the node 200. For example, the monitoring components 210 could be used to detect smoke, heat, fire, one or more chemicals, movement, or other conditions near the node 200. The monitoring components 210 include any suitable structure(s) capable on monitoring or detecting one or more conditions.

If the node represents the gateway 110 or an access point 108a-108b, the node 200 could further include a backhaul interface 212. The backhaul interface 212 allows the node 200 to communicate over a wired or wireless backhaul network, such as an Ethernet network. Among other things, this allows the gateway 110 or access point 108a-108b to communicate data towards the central station 102. The backhaul interface 212 includes any suitable structure supporting communications over a backhaul link.

Although FIG. 2 illustrates one example of a wireless node 200 in a monitoring and alarm system, various changes may be made to FIG. 2. For example, various components in FIG. 2 could be combined, subdivided, or omitted and additional components could be added according to particular needs. Also, a "wireless node" represents any device that can transmit or receive data wirelessly, even if the "wireless node" also has the ability to transmit or receive data over a wired connection and/or has the ability to receive power over a wired connection.

Figure 3:
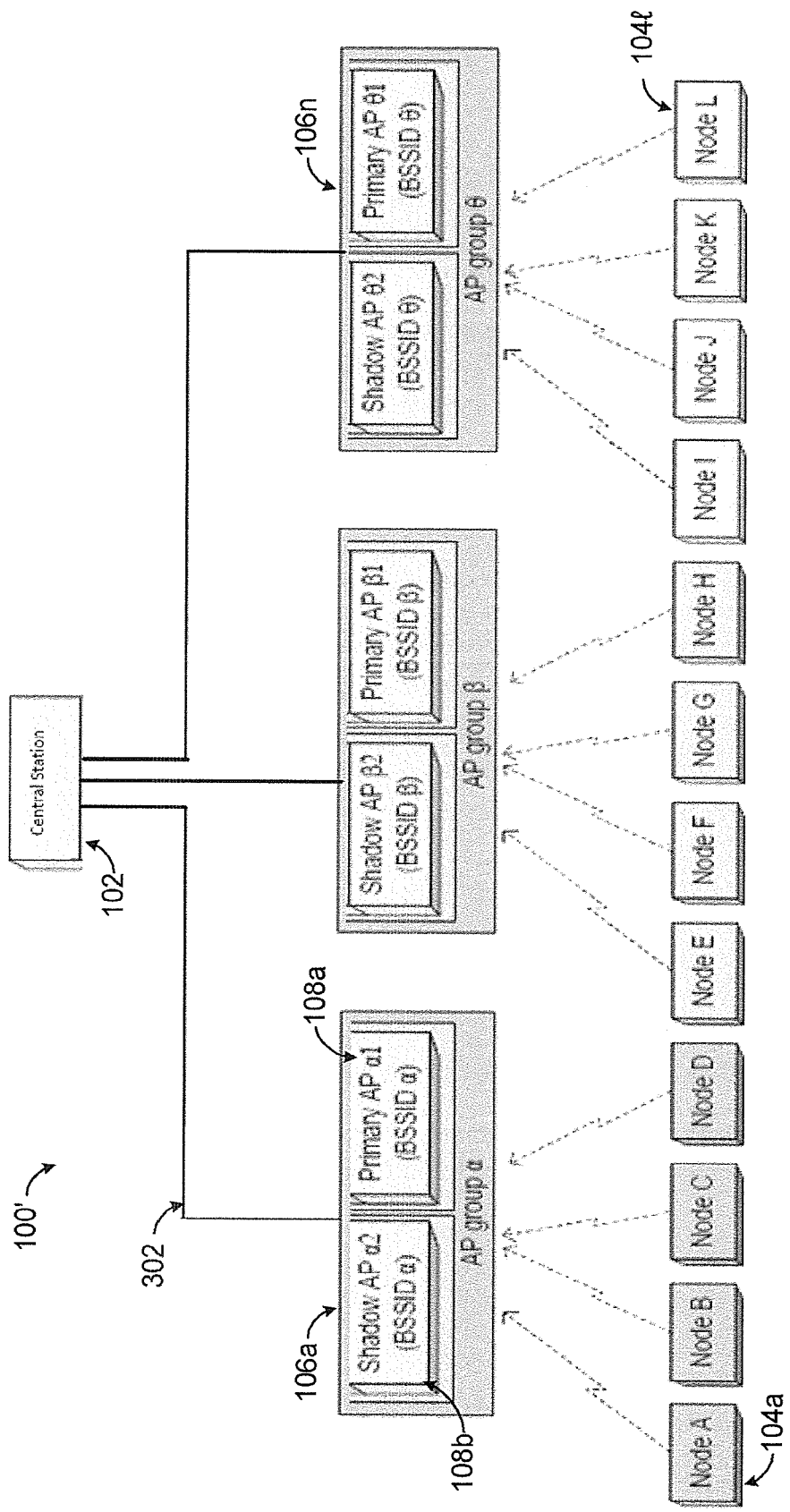
FIGS. 3 and 4 illustrate example backhaul communications involving access points in a monitoring and alarm system in accordance with this disclosure.
Figure 4:
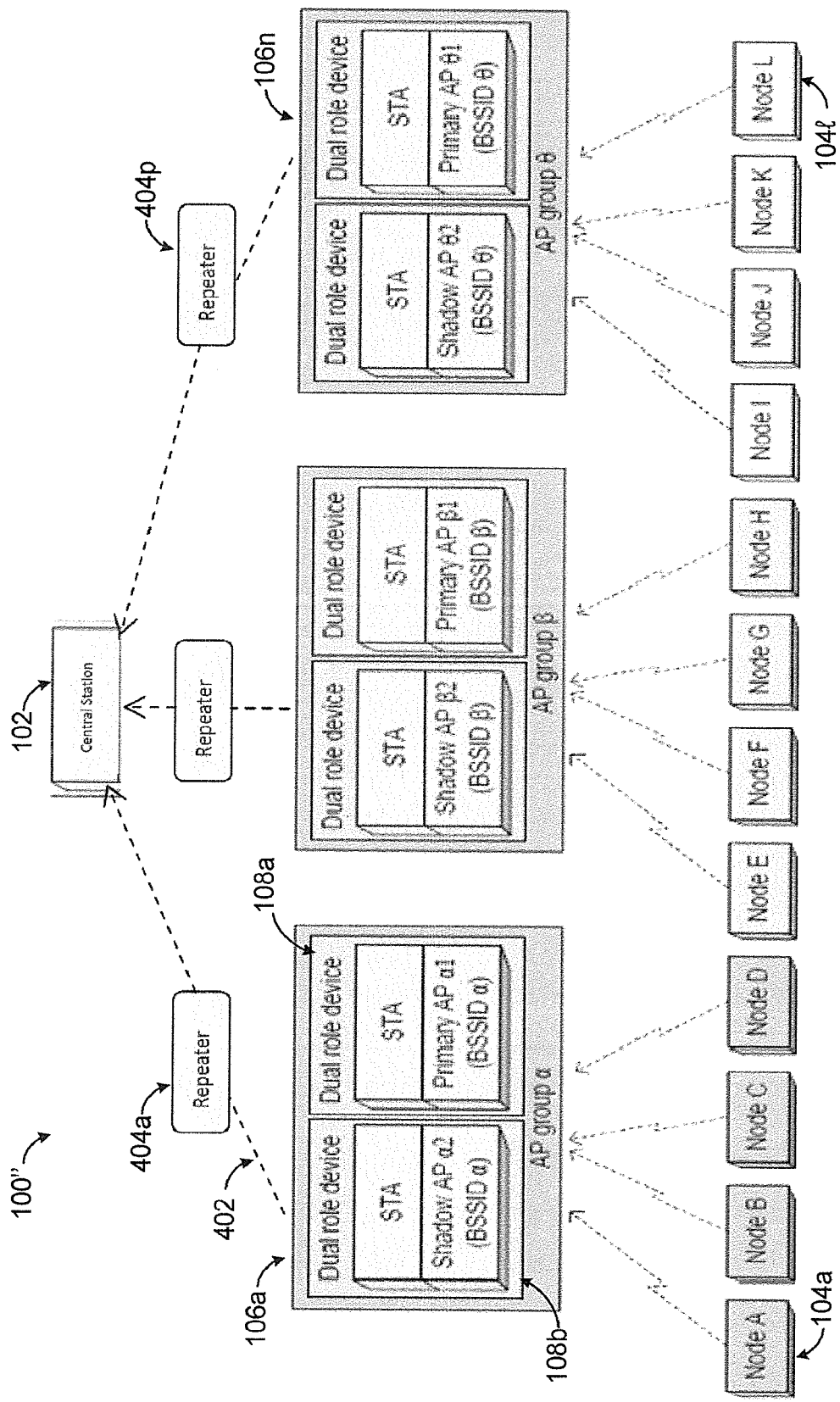

FIGS. 3 and 4 illustrate example backhaul communications involving access points 108a-108b in a monitoring and alarm system in accordance with this disclosure. In particular, FIGS. 3 and 4 illustrate example backhaul communications in monitoring and alarm systems 100' and 100", which are similar in structure to the system 100 of FIG. 1.

As shown in FIG. 3, the system 100' lacks a gateway 110 (although one could be used). Also, the access points 108a-108b communicate with the central station 102 via wired backhaul links 302. These backhaul links 302 couple the access points 108a-108b to the central station 102 and optionally to one another, and the access points 108a-108b use Ethernet or other wired protocol(s) to communicate. Optionally, power can be provided to the access points 108a-108b over the backhaul links 302, such as by using Power over Ethernet (PoE). If collisions are possible when communicating over the backhaul links 302, various content ion schemes could be used by the access points 108a-108b, such as carrier sense multiple access with collision detection (CSMA/CD). In other embodiments, time slots in a TDMA protocol can be used for communications.

In the embodiment shown in FIG. 3, no special considerations may be needed for the design of the wireless nodes 104a-104l. These nodes 104a-104l can operate as regular 802.11 stations. Similarly, when an access point is operating as a primary access point 108a, no special design considerations may be needed. The access point 108a can simply function as a regular 802.11 access point. When an access point is operating as a shadow access point 108b, the access point 108b can behave as a sniffer as described above. The shadow access point 108b can receive the same data over its backhaul link 302 that a primary access point 108a receives over its backhaul link 302, although the shadow access point 108b may refrain from transmitting that data. Similarly, the shadow access point 108b may receive the same wireless messages sent to a primary access point 108a from a wireless node, and the shadow access point 108b may or may not forward the wireless messages. In addition, the primary and shadow access points 108a-108b can share authentication credentials and network credentials through their backhaul links 302 (possibly with the central station 102 acting as an arbiter between the access points). As a result, the shadow access point 108b can remain ready to immediately assume the primary access point role, such as when indicated by the central station 102.

As shown in FIG. 4, the system 100″ again lacks a gateway 110, although one could be used. Also, the access points 108a-108b communicate with the central station 102 (and possibly each other) via wireless backhaul links 402. These wireless links 402 represent 802.11 wireless channels that can be used to transport data to and from the access points 108a-108b. Optionally, one or more additional access points 404a-404p could be used to increase the distance that the access points 108a-108b can reside from the central station 102. Note that the access points 108a-108b could be internally powered or line-powered devices.

An access point 108a-108b with a wireless backhaul link 402 can be implemented as a multi-role or multi-persona device. When communicating with components in a lower level of a tree hierarchy (such as one or more wireless nodes 104a-104l), an access point 108a-108b can be configured to operate using a "parent" persona in which the access point functions in the 802.11 access point mode. In this mode, the access point 108a-108b communicates with child nodes in the lower level of the tree. When communicating with components in a higher level of the tree hierarchy (such as an access point 404a-404p or the central station 102), an access point 108a-108b can be configured to operate using a "child" persona in which the access point functions in the 802.11 station mode. In that mode, the access point 108a-108b communicates with its parent node in the higher level of the tree. If desired, the network components in various levels of the tree hierarchy could operate in this manner, where information is propagated up the tree using child-to-parent communications and information is propagated down the tree using parents to-child communications.

Various approaches could be used to support multiple personas in a single 802.11 device. For example, in some embodiments, each access point 108a-108b could include multiple 802.11 wireless radios 206, where one wireless radio 206 is operated in access point mode and another wireless radio 206 is operated in station mode. In other embodiments, each access point 108a-108b could include a single 802.11 wireless radio 206, and the radio 206 could be reconfigured to operate in access point mode or station mode at different times. In still other embodiments, each access point 108a-108b could include a single 802.11 wireless radio 206 supporting WiFi Direct, a feature where WiFi devices can connect and communicate with one another without requiring an intermediate access point. To support this, each wireless radio 206 could operate in access point mode (with the parent persona) or station mode (with the child persona). Additional details regarding the use of multiple personas in an 802.11 device of a tree hierarchy can be found in U.S. patent application Ser. No. 13/826,709 titled "HIERARCHICAL TREE NETWORK USING TDMA PROTOCOL WITH 802.11 INFRASTRUCTURE NODES FOR FIRE DETECTION SYSTEMS AND OTHER SYSTEMS", which is hereby incorporated by reference.

When supporting wireless communications, the central station 102 (or the gateway 110) can support any suitable technique to communicate with multiple access points 108a-108b. For example, the central station 102 could create an 802.11 infrastructure network with its wireless radio 206, and the infrastructure network could include different orthogonal channels for transmissions to and from different access points 108a-108b. The central station 102 and other network components could also share time using a TDMA protocol.

Contentions in transmissions over the wireless backhaul links 402 could be handled using schemes such as Enhanced Distributed Channel Access (EDCA), hybrid coordination function (HCF) controlled channel access (HCCA), or CSMA/CD.

In the embodiment shown in FIG. 4, no special considerations may be needed for the design of the wireless nodes 104a-104l. These nodes 104a-104l, can operate as regular 802.11 stations. The access points 108a-108b can be designed to operate using multiple personas as described above. Thus, when an access point is operating as a primary access point 108a, the access point 108a can receive data in one persona and forward it in another persona. When an access point is operating as a shadow access point 108b, the access point 108b could similarly switch back and forth between the parent and child personas. For example, the shadow access point 108b can receive the same data over its backhaul link 402 that a primary access point 108a receives over its backhaul link 402, although the shadow access point 108b may refrain from transmitting that data. Similarly, the shadow access point 108b may receive the same wireless messages sent to a primary access point 108a from a wireless node, and the shadow access point 108b may or may not forward the wireless messages. In addition, the primary and shadow access points 108a-108b can share authentication credentials and network credentials through their backhaul links 402 (possibly with the central station 102 acting as an arbiter between the access points). As a result, the shadow access point 108b can remain ready to immediately assume the primary access point role, such as when indicated by the central station 102. The access points 404a-404p shown here may represent standard 802.11 access points, or they may represent multi-persona devices s that operate in both 802.11 access point mode and 802.11 station mode.

Although FIGS. 3 and 4 illustrate examples of backhaul communications in a monitoring and alarm system, various changes may be made to FIGS. 3 and 4. For example, at least one gateway 110 could be used between the access points 108a-108b and the central station 102 in each figure. Also, a combination of wired and wireless backhaul links could be used in a monitoring and alarm system.

Figure 5:
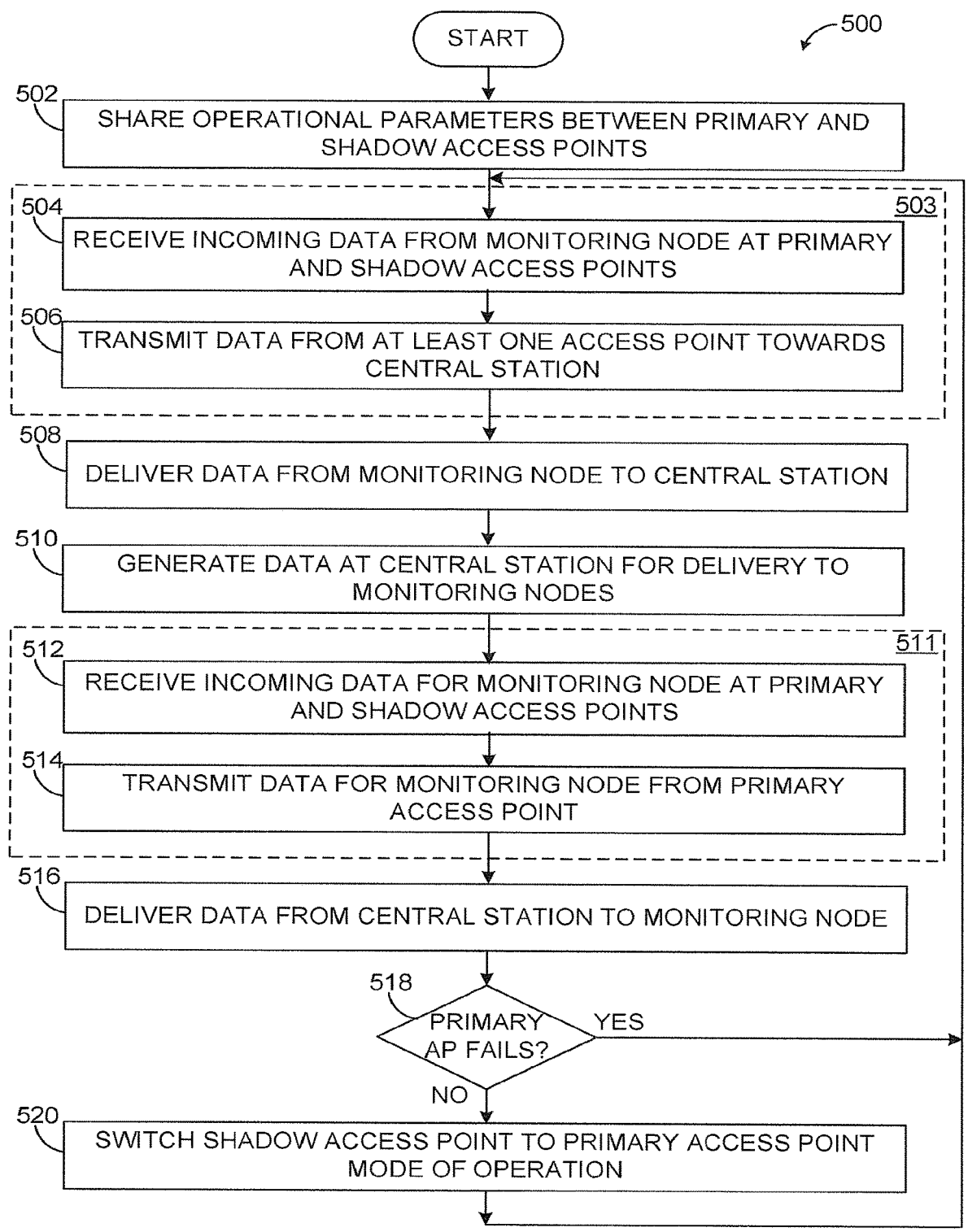
FIG. 5 illustrates an example method for is operating a monitoring and alarm system with a shadow access point using IEEE 802.11 infrastructure nodes in accordance with this disclosure.

FIG. 5 illustrates an example method 500 for 15 operating a monitoring and alarm system with a shadow access point using IEEE 80211 infrastructure nodes in accordance with this disclosure. As shown in FIG. 5, operational parameters are shared between primary and shadow access points at step 502. This could include, for example, a primary access point 108a sharing its network parameters (such as SSID and BSSID values), authentication credentials, network credentials, and other information with a shadow access point 108b Data is propagated up a tree hierarchy at step 503. Among other things, this includes receiving data from a monitoring node at the primary and shadow access points at step 504. The same wireless messages can be received from one of the wireless nodes 104a-104l at both its primary and shadow access points 108a-108b. This also includes transmitting the data towards a central station from at least one of the access points at step 506. The data can be transmitted from one or both of the access points 108a-108b. Some component (such as the gateway 110 or central station 102) could identify duplicative data messages and discard the duplicate messages. Alternatively, only one of the access points, such as the primary access point 108a, could transmit the data. The data is eventually delivered to the central station at step 508. This could include providing the data from the access point{s) directly to the central station 102 or indirectly to the central station 102 via the gateway 110. The data can be used by the central station 102 in any suitable manner.

The central station generates data for delivery to the monitoring node at step 510. This could include, for example, the central station 102 generating data for modifying the behavior of or requesting additional information from a wireless node 104a-104l. The data is propagated down the tree hierarchy at step 511. Among other things, this includes receiving the data for the monitoring node at the primary and shadow access points at step 512. The same data can be received at both the primary and shadow access points 108a-108b. This also includes transmitting the data to the monitoring node from the primary access point at step 514. During this step, the shadow access point 108b can refrain from transmitting the data, allowing only the primary access point 108a to transmit the data. The data is eventually delivered to the monitoring device at step 516. The data can be used by the monitoring device in any suitable manner.

If the primary access point remains operational and does not fail at step 518, steps 504-516 could occur any number of times. In the event the primary access point fails (such as due to a hardware, software, or power failure), the shadow access point switches to the primary mode of operation at step 520. This could include, for example, causing the shadow access point 108b to assume the role of the primary access point. At this point, steps 504-516 could repeat with the access point 108b operating as a primary access point. No shadow access point may be present at this point since the previous primary access point has failed. If and when the failed access point is repaired or replaced, that access point could assume operation as a new primary access point or as a shadow access point.

Although FIG. 5 illustrates one example of a method 500 for operating a monitoring and alarm system with a shadow access point using IEEE 802.11 infrastructure nodes, various changes may be made to FIG. 5. For example, while shown as a series of steps, various steps in FIG. 5 could overlap, occur in parallel, occur in a different order, or occur any number of times. Also, various steps in FIG. 5 could be omitted, such as when communication in a monitoring and alarm system is one-way (like from the monitoring devices to the central station). In addition, the primary access point 108a can fail at any point in the method 500 and need not fail at the specific point shown here.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
first and second access points, each access point comprising one or more wireless radios configured to communicate with a wireless node;
a central station adapted to receive and transmit data from and to the wireless node via the access points;
wherein the first and second access points are both configured to wirelessly receive first data from the wireless node and the first access point is configured to forward the first data to the central station; and
wherein the first and second access points are both configured to receive second data from the central station for the wireless node, the first access point is configured as a primary access point to wirelessly transmit the second data to the wireless node and to transmit a beacon signal to indicate the health of the first access point, and the second access point is configured as a shadow access point and to listen for the beacon signals to help verify that the primary access point is operating properly and, if the shadow access point fails to receive a beacon signal from the primary access point, the shadow access point begins transmitting the beacon signals using the same network information as the primary access point.

2. The system of claim 1, wherein the first access point is further configured to share network parameters authentication credentials, and network credentials with the second access point.

3. The system of claim 1, wherein the wireless radios in the first and second access points are configured to communicate with the wireless node using a common 802.11 basic service set identifier (BSSID).

4. The system of claim 1, wherein:
the first access point is configured to wirelessly transmit the second data to the wireless node while operating in a primary mode of operation;
the second access point is configured to refrain from transmitting the second data to the wireless node while operating in a shadow mode of operation; and
the second access point is further configured to switch to the primary mode of operation and to wirelessly transmit the second data to the wireless node when the first access point fails.

5. The system of claim 1, wherein:
each access point is configured to operate its associated one or more 802.11 wireless radios in an 802.11 access point mode and in an 802.11 station mode;

each access point is configured to relay data to and from the wireless node in the 802.11 access point mode; and each access point is configured to transmit data to and receive data from another access point in the 802.11 station mode.

6. The system of claim 1, wherein:

the system comprises a wireless network that includes multiple levels of access points; and multiple access points in each level are configured to operate 802.11 wireless radios in an 802.11 access point mode and in an 802.11 station mode.

7. The system of claim 1, wherein the access points and the wireless node form a portion of a hierarchical tree structure in which one or more devices residing in one level of the tree structure are configured to communicate with one or more devices residing in another level of the tree structure to propagate information through the tree structure.

8. The system of claim 1, wherein:

the second access point is configured to support a communication path to the wireless node that is ready to replace a communication path supported by the first access point to the wireless node; and the first and second access points support a standard 802.11 protocol where the wireless node operating as an 802.11 station is able to associate with a single access point.

9. The system of claim 1, wherein at least one of the first access point, the second access point, and the wireless node comprises a monitoring node, each monitoring node configured to monitor one or more conditions in a surrounding environment.

10. An apparatus comprising:

an access point configured to communicate with a wireless node and having a controller configured to cause the apparatus to operate as one of: a primary access point and a shadow access point;

wherein, as the primary access point and as the shadow access point, the apparatus is configured to wirelessly receive first data from the wireless node and, as the primary access point forward the first data to a central station;

wherein, as the primary access point, the apparatus is configured to receive second data for the wireless node and wirelessly transmit the second data to the wireless node and to transmit a beacon signal to indicate the health of the primary access point; and wherein, as the shadow access point, the apparatus is configured to receive the second data for the wireless node and listen for the beacon signals to help verify that the primary access point is operating properly and, if the shadow access point fails to receive a beacon signal from the primary access point, the shadow access point begins transmitting the beacon signals using the same network information as the primary access point.

11. The apparatus of claim 10, wherein the apparatus is further configured to share network parameters, authentication credentials, and network credentials with the other access point over a backhaul communication link.

12. The apparatus of claim 10, wherein the controller is configured, when the apparatus is operating as the shadow access point, to cause the apparatus to switch to function as the primary access point when the other access 30 point fails to serve the wireless node as the primary access point.

13. The apparatus of claim 10, wherein:

the apparatus is configured to operate the one or more 802.11 wireless radios in an 802.11 access point mode and in an 802.11 station mode;

the apparatus is configured to relay data to and from the wireless node in the 802.11 access point mode; and the apparatus is configured to transmit data to and receive data from a parent access point in the 802.11 station mode.

14. The apparatus of claim 10, wherein:

the apparatus, as the shadow access point, is configured to support a communication path to the wireless node that is ready to replace a communication path supported by the other access point to the wireless node; and the apparatus supports a standard 802.11 protocol where the wireless node operating as an 802.11 station is able to associate with a single access point.

15. The apparatus of claim 10, wherein the apparatus comprises a monitoring node configured to monitor one or more conditions in a surrounding environment.

16. A method comprising:

communicating at a first access point with a wireless node; and selectively operating the first access point as one of: a primary access point and a shadow access point;

wherein, as the primary access point and as the shadow access point, the first access point wirelessly receives first data from the wireless node and, as the primary access point forwards the first data to a central station;

wherein, as the primary access point, the first access point receives second data for the wireless node and wirelessly transmits the second data to the wireless node and transmits a heartbeat signal to the central station to indicate the health of the primary access point; and wherein, as the shadow access point, the first access point receives the second data for the wireless node and to transmit a beacon signal to indicate the health of the first access point, and the second access point is configured as a shadow access point and to listen for the beacon signals to help verify that the primary access point is operating properly and, if the shadow access point fails to receive a beacon signal from the primary access point, the shadow access point begins transmitting the beacon signals using the same network information as the primary access point.

17. The method of claim 16, further comprising:

sharing network parameters, authentication credentials, and network credentials between the first and second access points.

18. The method of claim 16, wherein selectively operating the first access point comprises causing the first access point to function as the primary access point when the second access point operating as the primary access point for the wireless node fails.

19. The method of claim 16, wherein:

the first access point operates the one or more 802.11 wireless radios in an 802.11 access point mode and in an 802.11 station mode;

the first access point relays data to and from the wireless node in the 802.11 access point mode; and the first access point transmits data to and receives data from a parent access point in the 802.11 station mode.

20. The method of claim 16, wherein:

a wireless network includes multiple levels of access points; and multiple access points in each level operate 802.11 wireless radios in an 802.11 access point mode and in an 802.11 station mode.

* * * * *